May 20, 1930.   E. WILDHABER   1,759,333
METHOD OF FORMING GEARS
Filed July 20, 1927   3 Sheets-Sheet 1
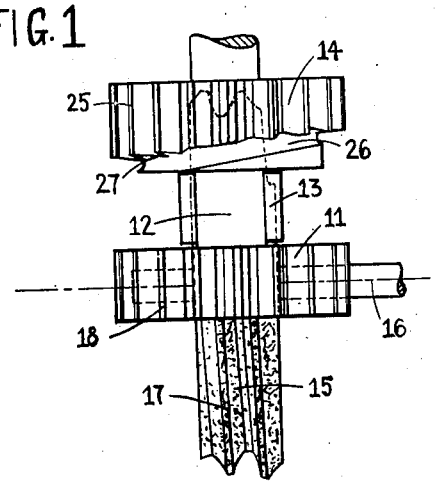
FIG.1
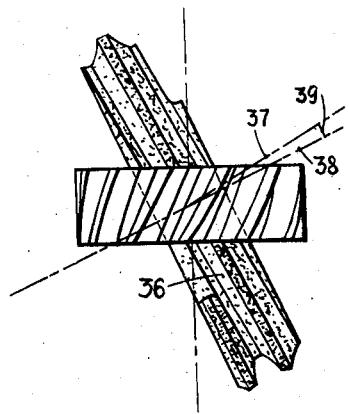
FIG.4
FIG.7
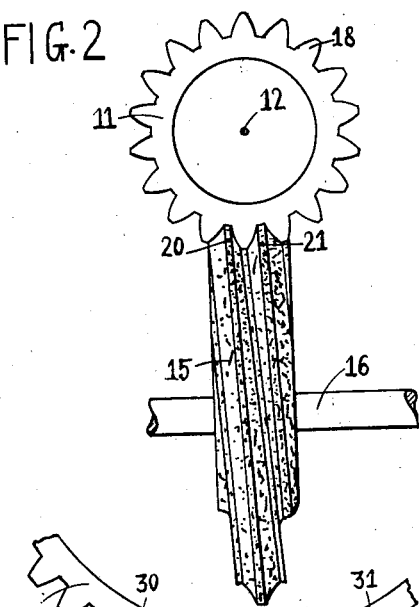
FIG.2
FIG.3
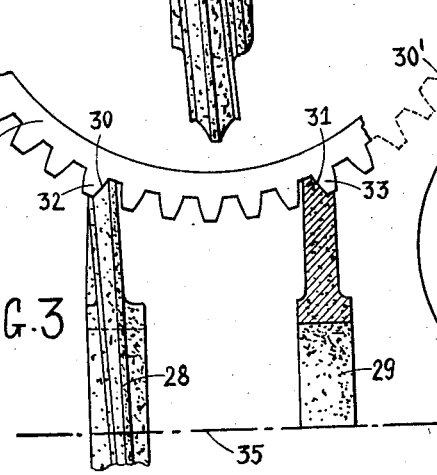
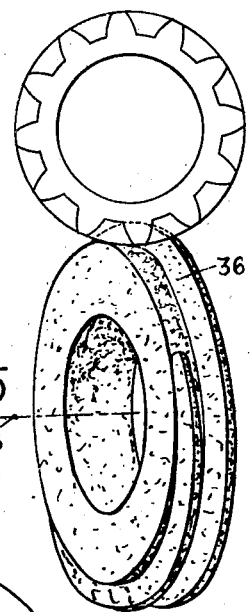
FIG.5
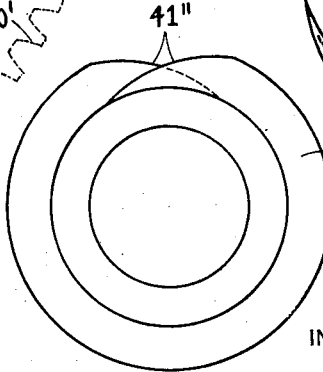
FIG.6
INVENTOR
Ernest Wildhaber May 20, 1930.  E. WILDHABER  1,759,333
METHOD OF FORMING GEARS
Filed July 20, 1927  3 Sheets-Sheet 2
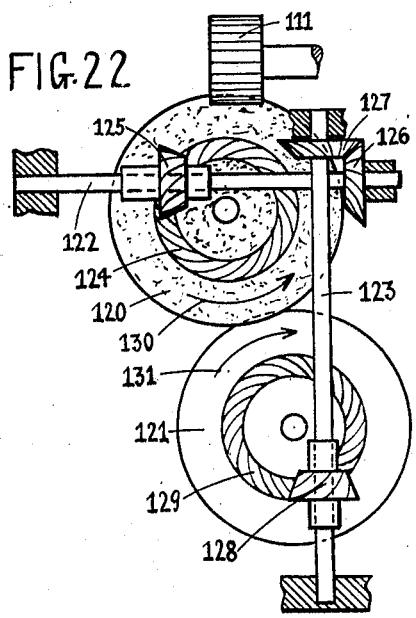
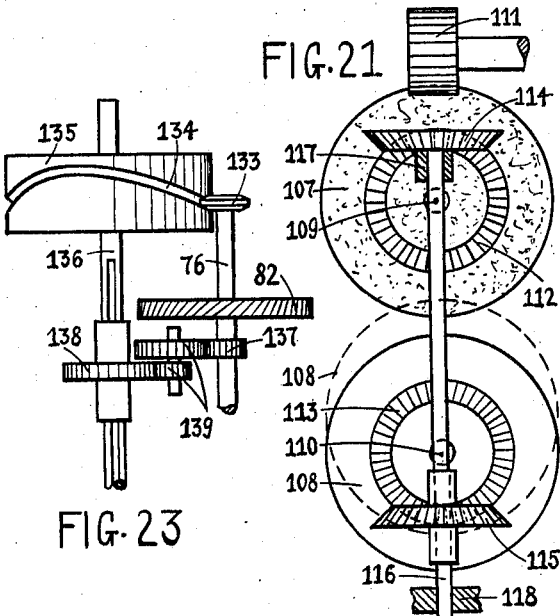
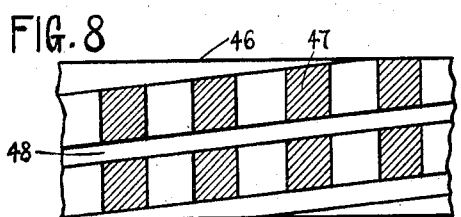
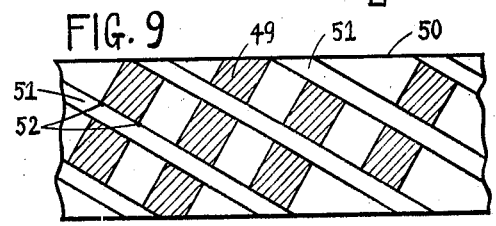
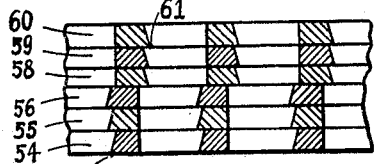
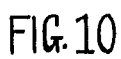
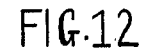
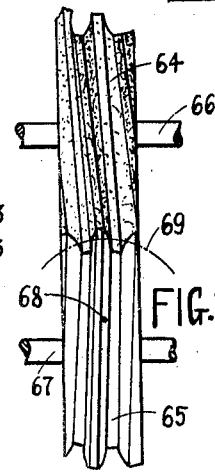
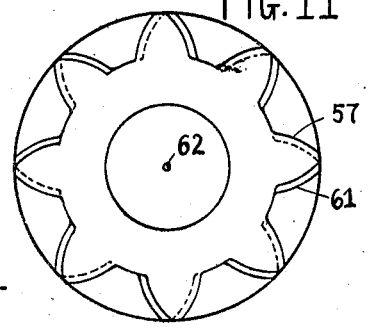
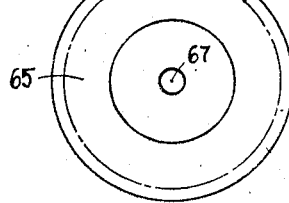
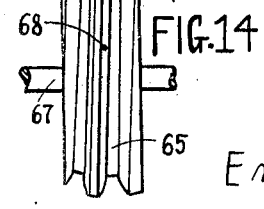
INVENTOR
Ernest Wildhaber May 20, 1930.  E. WILDHABER  1,759,333
METHOD OF FORMING GEARS
Filed July 20, 1927  3 Sheets-Sheet 3
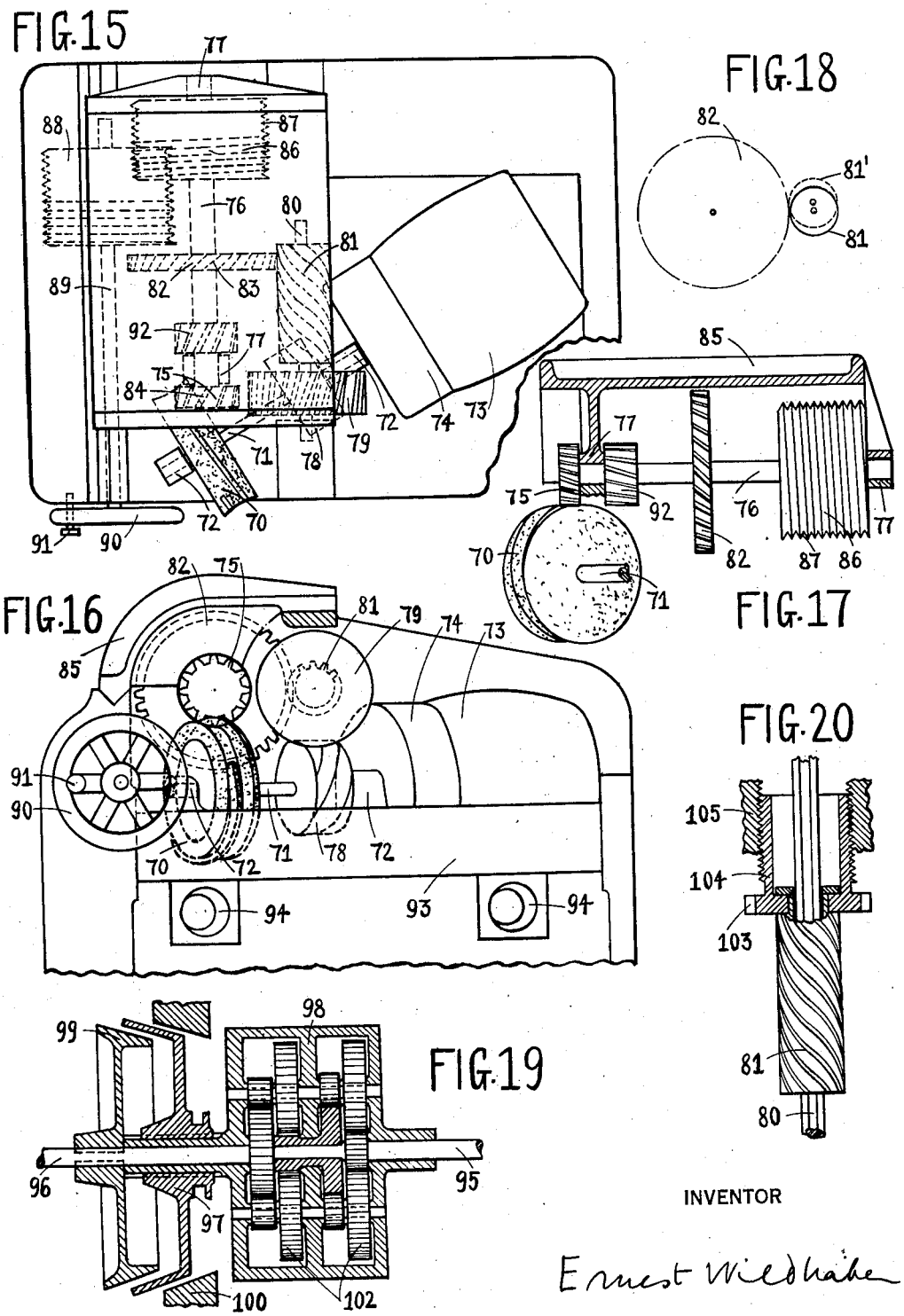

Patented May 20, 1930

1,759,333

UNITED STATES PATENT OFFICE

ERNEST WILDHABER, OF BROOKLYN, NEW YORK

METHOD OF FORMING GEARS

Application filed July 20, 1927. Serial No. 207,280.

The present invention relates to methods of forming gears, and particularly to such methods in which a forming member and a gear blank are rotated in timed relation to each other, to form teeth on said gear.

The invention is applicable to forming gears by cutting as well as to forming gears by grinding, by lapping, by burnishing, and may be applied generally to forming gears by removing stock, whether small amounts of stock or large amounts are to be removed.

One object of the present invention is to provide a novel method of finishing the tooth sides of gears with speed and accuracy. A further object is to devise a method of forming gears in a continuous process with a forming member of novel configuration.

A further aim is to devise a practical grinding method for forming gears in a continuous operation, with a grinding member having grinding portions disposed in a thread.

Methods for grinding gears in a continuous process with grinding members having grinding portions disposed in a thread hitherto required an excessive amount of time for truing or dressing said members to the required shape.

It is a further aim of the present invention to provide an accurate and quick truing or dressing operation for grinding members having grinding portions disposed in a thread or threads.

Grinding members hitherto provided for forming gears in a continuous operation and with continuous grinding contact, had grinding portions disposed in a helical thread of straight profile in axial section. The grinding member then represents the surface of a helical screw. In one case, a grinding member of this known type meshes with the finished teeth of a blank theoretically with point contact only, and therefore acts only on small portions at a time. In another case, a helical grinding member contains a straight profile (in axial section), disposed at right angles or substantially at right angles to its axis. While such a grinding member may contact along lines with the teeth of a blank, it does not form theoretically correct tooth profiles.

It is a further aim of the present invention to provide a method making use of a grinding member having grinding portions arranged in a thread, which is conjugate to a gear blank so as to mesh with line contact with said blank, while producing theoretically accurate gears.

A further aim is to provide a method of grinding gears with a member having grinding portions arranged in a thread of curved profile, which is suited to mesh with line contact with a blank.

A further object is to provide a method of grinding gears with a member having grinding portions disposed in a thread, whose profile changes its inclination with respect to its axis, so as to furnish a maximum of grinding contact.

A still other object is to devise a method of grinding gears in a continuous operation with a member having grinding portions disposed in a thread, which is suited to contact with a gear blank along a line extending substantially along a tooth profile, that is to say along a line reaching from the root directly to the point or tip of the teeth.

A further purpose is to provide a continuation of my invention as disclosed in my application entitled "Method of cutting gear teeth" filed March 2, 1925, Serial No. 12,572.

Numerous other objects will be apparent in the course of the specification and from recital of the appended claims.

My invention will be described with reference to examples illustrated in the accompanying drawings, in which Fig. 1 is a plan view of a gear blank and dressing member, and of a grinding member in engagement with said gear blank.

Fig. 2 is a front elevational view corresponding to Fig. 1.

Fig. 3 is a view, partly in section, of a pair of grinding members in engagement with opposite tooth sides of a gear blank.

Fig 4 is a plan view of a helical gear blank and of a grinding member in engagement with said gear.

Fig. 5 is a front elevational view corresponding to Fig. 4.

Fig. 6 is a diagrammatic end view of a grinding member, such as may be used in accordance with my invention.

Fig. 7 is a diagrammatic development of the circumference of a grinding member constructed in accordance with my invention, showing a grinding thread in section.

Fig. 8 and Fig. 9 are developments of one form of truing members, corresponding to gear blanks with straight teeth and with helical teeth respectively.

Fig. 10 is a development of the circumference of a slightly modified form of truing member, corresponding to straight teeth.

Fig. 11 is a front elevational view of a truing member of the type illustrated in Fig. 10.

Fig. 12 is a development of a pair of truing members corresponding to helical teeth.

Fig. 13 and Fig. 14 are a diagrammatic front view and corresponding side view of a grinding member and a truing member of further modified structure, the two members being shown in engagement with each other.

Fig. 15 is a diagrammatic plan view of a machine for grinding gears in accordance with my method.

Fig. 16 is a partial front elevation of the same.

Fig. 17 is a side view and section of the blank slide, also showing a grinding member in engagement with a blank, and corresponding to Figures 15 and 16.

Fig. 18 is a diagram illustrative of the different positions of a driving pinion relatively to its mating gear, in different phases of the life of a grinding member, in the embodiment of my invention as illustrated in the Figures 15-17.

Fig. 19 is a schematic section of a gear box, which may be disposed adjacent a grinding motor, and which furnishes a slow speed for truing or dressing in addition to a standard grinding speed.

Fig. 20 is a plan view, partly a section of an auxiliary device such as may be provided in a machine as illustrated in the Figures 15-17.

Fig. 21 and Fig. 22 are diagrams illustrative of the driving arrangement for truing in a manner as will be described with reference to the Figures 13 and 14.

Fig. 23 is a diagram illustrative of means for effective reciprocating feed in a machine for grinding gears.

In the Figures 1 and 2 the numeral 11 denotes a gear blank secured to an arbor or shaft 12. Arbor 12 is journalled in bearings, of which one is shown at 13, and carries a truing or dressing member 14 rigidly secured to said arbor. A grinding member 15 is rotatable on an axis 16, and is provided with grinding portions disposed in a thread or threads 17. The blank 11 is provided with straight teeth 18 which extend along its axis.

In known methods of the character referred to, the thread of the grinding or cutting member has the form of a screw thread, with straight profile in axial section, and is ordinarily conjugate or approximately conjugate to the basic rack, to which the gear blank is also conjugate.

According to the present invention the thread 17 of the grinding member is directly conjugate to the teeth 18 of blank 11, so that it meshes with line contact with said blank, simultaneous contact being made along a line, which during the mesh moves on the tooth surface of the blank. The whole extent or a part of the tooth surfaces may be swept during every revolution of the blank, depending on whether the face of the gear blank is narrow or wide. Contact between the grinding thread and the teeth of a blank is effected ordinarily along the profiles of the blank, or rather along lines which are inclined only by small angles to said profiles. The thread of the grinding member contains therefore profiles which are nearly equal to the profiles of the teeth of the blank. It is noted that the profiles of the grinding threads are curved, and that they change their inclination to the axis 16 of a thread.

My method of grinding has a certain resemblance to grinding with a formed disk wheel, having a profile equal to the profile of a blank, inasmuch as grinding contact is effected in a somewhat similar manner. My method differs from the said method by effecting continuous grinding contact with a rotating blank, and therefore by finishing all the teeth simultaneously, whereas in the known method referred to the different tooth spaces are successively finished, and the blank is periodically indexed.

In operation, the grinding member is turned on its axis 16 and the blank is turned on its axis 12 in timed relation. When the grinding member is provided with a single thread, that is to say when the adjacent portions 20, 21 belong to successive turns of the same thread, the grinding member is rotated a number of revolutions equal to the number of teeth in the blank per revolution of the blank. In general the number of revolutions of grinding member and blank are inversely proportional to the respective numbers of teeth or threads.

Although grinding members may be devised, which cover the entire tooth surfaces while rotating in a single relative position, nevertheless a feeding motion is preferably provided, when the gear blank contains straight or helical teeth of constant profile. The feeding motion is found to furnish gears of great uniformity in lengthwise direction, irrespective of wear of the grinding member. The feeding motion may consist of a motion between grinding wheel and blank in the direction of the teeth of the blank, and is then a translatory motion in the direction of the blank axis, if the teeth are straight and parallel to said axis. It is a helicoidal motion in the case of helical teeth of the blank, the lead of said motion being equal to the lead of said teeth. The feed motion is then composed of a translation in the direction of the blank axis and an additional rotation on said axis.

The said feeding motion may be embodied as a single motion per grinding operation, or as a repeated or periodical motion of reciprocating nature. Embodiment as a single motion can be effected with a very simple structure, as will be explained with reference to the Figures 15-17. Means for obtaining a suitable periodical feeding motion are described with reference to Fig. 23.

When grinding straight tooth gears (Fig. 1 and Fig. 2), the axis of a grinding member is preferably set at right angles to the axis of the blank, provided that a grinding member of single thread is used, as shown in the drawings. I may however also set the grinding member to its average lead angle, or to any other suitable angle within a range which comprises the different angles at which the direction of the thread of the grinding member fits the direction of the teeth of the blank sufficiently to avoid an excessive fillet at the root of the teeth of the blank. It is found that by setting the grinding member to its said lead angle the thickness of its thread is a maximum, and that a different inclination angle reduces slightly the thickness of the grinding thread to be used. The position of the grinding member also affects the fillet of the teeth, which connects the tooth profile proper with the bottom of a tooth space. The fillet is not suited to transmit motion and is therefore kept small, an aim which is ordinarily obtained without effort, unless the grinding member is set to an angle differing excessively from the said lead angle.

Setting the grinding member at right angles to the axis of the blank is found to produce satisfactory results for grinding straight tooth gears, and is ordinarily preferred on account of the structural simplicity. When grinding gears without feed motion, however, the grinding member is preferably set to its lead angle, in which case the whole length of face of the teeth can be more easily covered on both tooth sides together, because it is found that tooth contact of both tooth sides then has a more nearly equal position lengthwise of the face of the gear.

In any case the thread surface of the grinding member is a surface of mathematically definite character. It is the surface which at a given relative position of the respective centers is conjugate to the finished tooth sides of a given gear blank, in such manner as to mesh with line contact with said tooth sides. In other words it is a surface, such as is swept out or enveloped by a tooth surface of the blank in its relative path with respect to said member.

One way of obtaining such a surface is by providing a cutting edge extending on the tooth surface of a gear blank from root to point of a tooth, the portions back of the cutting edge being suitably relieved, by rotating said cutting edge on the axis of the blank, by rotating a member in timed relation in the manner of a grinding member meshing with the gear blank, and in providing feeding motion between said cutting edge and said member in the direction of the teeth of the gear blank. In this manner the steps of the grinding process are performed, with the difference of having a formed cutting edge in place of a blank, and of having a test member to be formed in place of the grinding member.

Another way of obtaining a thread surface of the described character is by providing a finished gear of the same character as a finished gear blank, by providing flutes in said gear so as to form a great number of cutting edges covering the whole face of the teeth, by providing relief back of the cutting edges if so desired, and by rotating said gear adjacent a rotating member in the same manner as the gear blank rotates adjacent a rotating grinding member. Feed motion may be omitted in this case.

In either case the proper thread surface will be formed on said member.

In one embodiment of my invention, the described ways of forming the thread surface are directly utilized for truing or dressing the grinding member.

Preferably a grinding member of comparatively soft grade is then provided, which while grinding well at the proper high speeds, ceases to grind at very slow speeds. At very slow speeds the pressure exerted by the truing member on the grinding member loosens the grinding grains in their comparatively soft bed and finally dresses them off or shaves them off, while not being unduly affected by the hard grains.

A dressing member of this type is shown at 14 in Fig. 1. It is a hardened and ground gear identical with a finished gear blank, containing in this case unrelieved teeth 25 equal to the teeth 18 of blank 11. In addition a single helical flute 26 is provided, forming edges 27 on the teeth 25. Dressing member 14 is coaxial with the blank and secured to the same arbor 12. Before or after a blank is finish ground, a very low speed of the grinding member is effected, the blank and dressing member are advanced, so that the dressing member engages the grinding member in the same manner as the blank engages the grinding member. The latter is then trued or dressed, while a feeding motion is provided.

Fig. 3 illustrates a slightly modified embodiment of my invention. A pair of coaxial grinding members 28, 29 are used, operating on opposite tooth sides 30, 31 of different teeth 32, 33 of a blank 34, said sides 30, 31 facing towards each other. With the greater inclination of the grinding profiles, with respect to a plane perpendicular to the axis 35 of the grinding members, increased rigidity of the grinding members may be obtained. A step in the direction of cylindrical grinding wheels is thus made, which are noted for their rigidity.

While I have shown convex tooth profiles 30, 31, concave tooth profiles might also be provided, as indicated in dotted lines 30'.

In the Figures 4 and 5 I have illustrated an application of my method to grinding helical gear teeth. The grinding member 36 is then set preferably to the lead angle in its center. The numeral 37 denotes a tooth normal, that is perpendicular to the direction of a tooth, in grinding contact. The axis 38 of grinding member 36 is inclined at the lead angle 39 to said tooth normal. Grinding member and blank are rotated in timed relation in engagement with one another, and preferably a feeding motion is provided in the direction of the helical teeth of the blank.

Preferably the grinding members are provided with single threads in the applications chiefly considered. Either a single turn or a plurality of turns of a single thread are used.

One of the difficulties hitherto encountered in grinding gears with a member having grinding portions disposed in a thread, is the fact that a perfectly balanced grinding member gradually gets out of balance after repeated truing or dressing. The reason of that, and the remedy here provided will be explained with reference to the Figures 6 and 7. In the development Fig. 7 the thread 41 of a grinding member is inclined at a small angle to the end periphery 42 of said member. If the thread were continued to the end periphery 42, as indicated in dotted lines 41', then the acute portion adjacent the end would be very weak and might break down at the least knock. For this reason the dotted end of the thread 41 is removed, and the central part of the thread, intermediate the top and the bottom, reaches about as far as shaded. The ends of the thread 41 are so shaped as to reach the bottom gradually, see Fig. 6, which illustrates a similar grinding member.

When truing in a known manner or also in the manner just described, the inclined ends 41'' of the thread 41 are left out in truing, and remain as they are, while stock is removed from all other parts, namely from the bottom, from the top and from the sides of the thread. Least grinding material is therefore removed on the side of the ends 41'', that is to say on the top of the member shown in Fig. 6. The center of gravity of the whole member moves therefore towards this side after repeated truing and brings the grinding member out of balance, unless a remedy is provided.

A remedy may be obtained by providing additional material on the side of ends 41'', so that the same amount is being trued off or dressed off all around the grinding member. Only a small width 43 of the thread bottoms (see Fig. 7) is embodied with grinding stock on the side opposite to ends 41'', whereas adjacent these ends the whole width 44 of the thread bottom is embodied by grinding material. In dressing, the additional material to be removed from the thread bottom makes up for the material lost or left on the ends 41''.

The thread bottoms, it is understood, ordinarily are kept clear of the top or point of the teeth of the blank, and serve only for reinforcing the strength of the grinding thread, and according to the above, for keeping the grinding member balanced.

Fig. 8 is a development of the periphery 46 of a truing member of the type shown in Fig. 1. It contains unrelieved straight teeth 47 identical with the teeth of a finished gear blank, cutting edges being formed by a single helical flute 48, which extends over a plurality of turns.

A truing member of the same character, but applied to helical teeth, is shown in development in Fig. 9. The teeth 49 are identical with the teeth of a finished gear blank, and are inclined to the periphery 50. A number of helical flutes 51 are provided, to form cutting edges 52 or rather truing edges. The number of flutes 51 has no factor in common with the number of teeth of the blank. The various cutting edges 52 are then all disposed at different axial positions, and cover the face of the teeth uniformly. The described restriction is however only then important, when no feed motion is provided in dressing. If feed motion is provided, it is immaterial.

Frequently relief will be provided back of the cutting edges or dressing edges. When relief is provided, I usually dispose the edges for dressing one side of a grinding thread on one member, and the edges for dressing the opposite side on another member. The two members are coaxially arranged, and angularly adjustable with respect to one another.

In Fig. 10, concentric disks 54, 55, 56 are provided, containing relieved edges 57, and constituting a truing member for truing one side of a grinding thread. Other disks 58, 59, 60 contain relieved edges 61, and constitute a truing member for truing or dressing the opposite side of said thread. The two members are angularly adjustable with respect to one another about their axis 62, see Fig. 11. When the edges are unduly scratched through long service, the faces of the disks are ground off, so that their thickness is diminished; the disks are again assembled and suitably adjusted.

Fig. 12 indicates two sets of disks adapted for truing a grinding member to grind helical teeth.

The truing members thus far described act on the grinding members substantially in a sliding motion, which is kept slow. Other truing members will now be described with reference to Figures 13 and 14. These other truing members act on each other substantially with rolling contact, and are therefore least apt to get scratched.

For truing or dressing, the grinding member 64 and truing member 65 are rolled in engagement with each other, preferably on parallel axes 66, 67. The two members 64 and 65 are fully conjugate to each other, like two intermeshing gears turning on parallel axes, and contact with each other along a line or lines at a time, which lines gradually sweep the respective surfaces. The two cylindrical pitch surfaces 53, 63 roll upon each other without sliding. The truing action is here effected through pressure, protruding grinding grains being loosened in their bedding through the pressure exerted by the truing member.

The surface of a truing member of the said type may be determined, by first determining the grinding surface in the manner described, and then from the known grinding surface determining the truing surface as the conjugate surface, namely as the tooth surface of a gear suited to mesh with the grinding surface while turning on parallel centers.

The above truing member does not require feed between truing member and grinding member during truing. A truing member of this character may also true or dress the ends 41″ (Fig. 6) of the grinding thread, and maintains perfect balance of the grinding member without special provisions.

When feed can be readily provided, then the truing member may be made conjugate to the teeth of an internal gear, which is the counterpart of the gear blank. If in Fig. 14, the gear center is located at 68, then the grinding member 64 is conjugate to the external gear having a center 68 and a pitch circle 69; and the truing member 65 is conjugate to the teeth of an internal gear of the same center 68 and pitch circle 69. The diameter of the truing member may be made larger than the diameter of said internal gear, as shown. The two members 64, 65 are not fully conjugate to each other, and do not mesh with line contact. The respective thread surfaces are not completely covered by rotation in a single relative position, but only gradually after completed feed along the teeth of the blank represented.

In any case, the truing member is of gear form, and truing is effected through gear mesh between a truing member and a grinding member.

A machine for grinding helical gears in accordance with my invention will now be described with reference to the Figures 15–17. Straight tooth gears may also be ground with the same machine, when providing a different inclination of the axis of the grinding member, especially when setting said axis at right angles to the axis of the blank.

A grinding member 70 of the character set forth is rotated on an axis 71, which is journalled in suitable bearings, indicated at 72, and receives power from a motor 73. A change speed gear is provided in a casing 74, for effecting slow truing speed. Member 70 engages blank 75 secured to an arbor 76, which is journalled in bearings 77. Preferably a positive operative connection is provided between grinding member 70 and blank 75. This connection consists in the present instance of a worm 78 secured to shaft 71 of the grinding member, of a worm wheel 79 secured to a shaft 80 disposed parallel to the arbor 76 of the blank, and of a pinion 81 and master gear 82, secured respectively to shaft 80 and arbor 76. Master gear 82 is preferably of larger diameter as compared with the gear blank 75 and contains helical teeth 83 having the same lead as the teeth 84 of blank 75. The inclination of the teeth 83 of the larger gear is therefore larger than the inclination of the teeth 84. In case of straight teeth of the blank, the teeth of gear 82 are also straight. The bearings 77 form part of a slide 85, which is movable in the direction on the blank arbor (76). The latter can therefore be considered movable about its axis and in the direction of its axis. Arbor 76 further carries a member 86 rigidly secured to it and containing an external thread 87, having a lead equal to the desired feed per revolution of the blank. Thread 87 engages another external thread 88, which is axially fixed and rotatable on an axis 89 by means of hand wheel 90. Thread 88 ordinarily is kept in a fixed position by a pin 91 disposed on hand wheel 90 and engaging a suitable hole or recess. A truing member 92 of gear form is secured to arbor 76.

The operation is as follows: Grinding member 70 is rotated on its axis 71, and through worm 78, worm wheel 79, pinion 81 and master gear 82, the blank 75 is rotated on its axis in timed relation to the rotation of the grinding member 70. As the blank rotates, the thread 87 advances in the stationary thread 88, and moves arbor 76 in the direction of its axis. On account of the mesh between the helical master gear 82 and pinion 81 feeding motion is thus added to the rotary motions, which is a helical motion in the direction of teeth 83, or in other words a motion composed of a translation in the direction of axis 76 and angularly about said axis, the distance of translation per revolution of the superimposed feed motion being equal to the lead of teeth 83.

After the grinding member has passed through the teeth of the gear blank, the change speed gear is set for very slow speed, hand wheel 90 is turned in a direction to move the grinding member adjacent the truing member 92, table 93 is lifted by a small amount by operating the two eccentrics 94 on which table 93 rests, and the truing member is slowly passed through the grinding member by further operating hand wheel 90. It is then returned; the gear blank is taken off, a new blank is put on and placed in starting position. I have shown the hand wheel 90 directly connected with thread 88 for simplicity's sake, but usually may provide a hand wheel 90 geared to thread 88, and may further make additions and refinements, while maintaining the same general principles.

The two eccentrics may be operated with gears in a known manner which needs no explanation, and which does not form part of the principles of my invention.

A planetary gear for obtaining a suitable slow dressing speed, such as might be placed in casing 74, is diagrammatically indicated in Fig. 19. For grinding, the driving shaft 95 and driven shaft 96 are connected by means of a friction clutch, member 97 having been moved in splines of planetary casing 98 into contact with member 99 keyed to the driven shaft 96. For effecting slow speed, member 97 is moved into contact with stationary surface 100, thereby holding planetary casing 98 stationary, and effecting a large reduction through the enclosed gears 102.

As table 93 is lifted vertically before each truing operation, pinion 81 gradually moves for instance from the position shown in full lines in Fig. 18 to position 81' shown in dotted lines, and thereby rotates the master gear 82 and the blank 75. Adjustment between grinding member and truing member is then necessary to eliminate the effect of said additional rotation, and to dress off equal amounts of grinding stock on either side of the thread of grinding member 70. Such compensation may be effected for instance by axially moving pinion 81 relatively to worm wheel 79, such as will be described with reference to Fig. 20. Pinion 81 is axially movable in splines of shaft 80, and may be moved in proportion with the vertical adjustment of table 93, by means of a gear 103, which is axially fixed to pinion 81. Gear 103 contains a threaded projection 104, which engages a stationary thread 105. Ordinarily gear 103 is maintained stationary. When it is rotated, it screws itself in or out of thread 105, and carries pinion 81 along axially.

The diagram Figure 21 indicates a gear connection between a grinding member 107 and a truing member 108 of the type indicated in the Figures 13 and 14. Member 108 is conjugate to grinding member 107 and suited to mesh with line contact with said member, when both members are rotated on parallel axes 109, 110 in timed relation. Member 107 is shown in grinding contact with blank 111. Dressing or truing may be effected during grinding, if so desired. The truing member 108 is geared to grinding member 107 by two bevel gears 112, 113 and two coaxial pinions 114, 115 of which pinion 115 is slidable in splines of shaft 116, suitable bearings are provided, partly shown at 117, 118. Ordinarily truing member 108 is in the position indicated in full lines. For truing it is approached to the grinding member and assumes then a position as indicated in dotted lines 108'.

A gear connection between a grinding member 120 and a dressing member 121 of the type requiring feeding motion is indicated in Figure 22. The drive is here effected through two splined shafts 123, 123, by means of a hypoid gear 124, a hypoid pinion 125, a pair of hypoid miter gears 126, 127, a hypoid pinion 128 and mating gear 129. The pinions 125, 128 are slidably mounted on shafts 122, 123 respectively, being connected to said shafts with splines. The said gear connection permits feeding motion lengthwise of shaft 122, and adjustment lengthwise of shaft 123. Truing is effected by rolling grinding member 120 and truing member 121 together, in the direction of arrows 130, 131.

In Figure 23 means are diagrammatically indicated for effecting reciprocating feed between grinding member and blank, in place of the continuous feed in one direction provided in the embodiment shown in the Figures 15 to 17. The shaft or arbor 76 contains the gear blank and master gear 82, and possesses in addition a disk 133 with tapered sides. Said disk engages a slot 134 of a drum 135, which is rotated on its axis 136 by means of a pinion 137 secured to shaft 76, a gear 138 slidable in splines of shaft 136, and intermediate gears 139. All said gears partake at the feed motion of shaft 76. The drum 135 ordinarily is fixed in axial direction, but may be adjusted axially by hand, with means not indicated.

As shaft 76 rotates, it also turns shaft 136 by means of the above said gears 137, 138, 139. Drum 135 is thus rotated in proportion to the rotation of shaft 76, and by moving different portions of slot 134 adjacent disk 133, the shaft 76 is fed in the direction of its axis. Slot 134 is of the form of a closed groove, which extends on the circumference of the drum 135.

While I have described my invention particularly as applied to grinding, the same steps may also be employed for lapping gears, for burnishing gears, and for cutting gears.

Moreover many further changes and modifications may be made in my invention by simply applying the customary practice of the art, and without departing from its spirit. For definition of the scope of my invention it is relied upon the annexed claims.

What I claim is:

1. The method of grinding gears of constant profile, which consists in providing two coaxial members having grinding portions disposed in a thread, in positioning said members so as to engage only opposite sides of different teeth of a gear blank, the portions simultaneously engaged facing towards each other and being displaced angularly about the axis of said gear blank relatively to each other, in rotating grinding members and blank on the respective axes in timed relation to each other, and in providing feeding motion between grinding members and blank in the direction of the teeth of the blank.

2. The method of grinding gears, which consists in providing two rotary members having grinding portions disposed in threads, in positioning said members so as to engage only opposite sides of different teeth of a gear blank, the portions simultaneously engaged facing towards each other and being displaced angularly about the axis of said gear blank relatively to each other, and in rotating grinding members and blank on their respective axes in timed relation to each other.

3. In a machine for grinding gears, an arbor for holding a gear blank, said arbor being rotatable on its axis and movable in the direction of its axis, a screw thread secured to said arbor for feeding said arbor in proportion to its turning motion, and rotatable means engaging said screw thread.

4. In a machine for grinding gears, an arbor for holding a gear blank, said arbor being rotatable on its axis and movable in the direction of its axis, a master gear of increased diameter as compared with the gear blank, and means for rotating a grinding member and the blank continuously, in timed relation to each other.

5. In a machine for grinding helical gears, an arbor for holding a gear blank, said arbor being rotatable on its axis and movable in the direction of its axis, a master gear of increased diameter as compared with the gear blank, said master gear having helical teeth of the same lead as the teeth of the blank, and means for continuously rotating the blank and a grinding member, in timed relation to each other.

6. The method of forming gears of constant profile, which consists in providing a rotary member having active portions disposed in a thread fully conjugate to the tooth surfaces of an accurately finished gear blank in a manner to mesh with line contact with said tooth surfaces, said thread having a curved profile in an axial plane, in positioning said member relatively to a gear blank at an angle differing from the angle of its mating gear by at least thirty degrees (30°), in rotating said member in engagement with said gear blank, and in rotating the gear blank on its axis in timed relation to the rotation of said member.

7. The method of forming gears of constant profile, which consists in providing a rotary member having active portions disposed in a thread, the thread profile in an axial plane having a general inclination changing lengthwise of the thread with respect to the axis of said thread, in positioning said member in engagement with a gear blank, in rotating said member, and in rotating the gear blank on its axis in timed relation to the rotation of said member.

8. The method of forming gears of constant profile, which consists in providing a rotary member having active portions disposed in a thread protruding over the tooth surfaces of a rack conjugate to a finished gear blank, said thread having a concavely curved profile in an axial plane, in positioning said member in engagement with a gear blank, in rotating said member on an axis angularly disposed to the axis of the gear blank and offset from said axis, and in rotating the gear blank in timed relation with said member.

9. The method of forming gears, which consists in providing a rotary member having active portions disposed in a thread, the thread profile in an axial plane being concavely curved and having a general inclination changing lengthwise of the thread relatively to the axis of said member, in rotating said member in engagement with a gear blank, and in rotating the gear blank on its axis in timed relation with said member.

10. The method of grinding gears, which consists in providing a rotary member having grinding portions disposed in a thread fully conjugate to the tooth surfaces of an accurately finished gear blank in a manner to mesh with line contact with said tooth surfaces, said thread having a curved profile in an axial plane, in positioning said member in engagement with a gear blank, in rotating said member, and in rotating the gear blank on its axis in timed relation with said member, the axis of said gear blank and the axis of said member bearing a different relation to each other than the axis of said gear blank and the axis of its mating gear.

11. The method of grinding gears, which consists in providing a rotary member having grinding portions disposed in a thread fully conjugate to the tooth surfaces of an accurately finished gear blank in a manner to mesh with line contact with said tooth surfaces, the thread profile in an axial plane being curved and having a general inclination changing lengthwise of the thread relatively to the axis of said thread, in rotating said member in engagement with a gear blank, in rotating said gear blank on its axis in timed relation to the rotation of said member, and in providing feeding motion between said gear blank and said member along the axis of said gear blank.

12. The method of grinding gears of constant profile, which consists in providing a rotary member having grinding portions disposed in a thread fully conjugate to the tooth surfaces of an accurately finished gear blank in a manner to mesh with line contact with said tooth surfaces, the thread profile in an axial plane being curved and having a general inclination changing lengthwise of the thread relatively to the axis of said thread, in rotating said member, in rotating a gear blank on its axis in timed relation to said member, and in feeding the gear blank in a direction lengthwise of its teeth.

13. The method of grinding gears, which consists in providing a rotary member having grinding portions disposed in a thread, the thread profile in an axial plane being curved and having a general inclination changing lengthwise of the thread relatively to the axis of said thread, in rotating said member in engagement with a gear blank, and in rotating the gear blank on its axis in timed relation to the rotation of said member.

14. The method of grinding gears, which consists in providing a rotary member having grinding portions disposed in a thread, the thread profile in an axial plane being curved and having a general inclination changing lengthwise of the thread relatively to the axis of said thread, in rotating said member, in rotating a gear blank on its axis in timed relation with said member, and in providing feeding motion between the blank and said member along the teeth of the blank.

15. The method of forming gears, which consists in providing a gear blank and a rotary member having continuous threads fully conjugate to the final tooth surfaces of said gear blank, said member differing from the gear intended to run with the finished gear blank, the thread profile of said member in an axial plane being curved and having a general inclination changing lengthwise of the thread with respect to the axis of the thread, and in rotating said member in abrasive engagement with said gear blank at the ratio of the respective numbers of teeth and threads.

16. The method of forming gears, which consists in providing a gear blank and a rotary member having continuous threads fully conjugate to the final tooth surfaces of said gear blank, said member differing from the gear intended to run with the finished gear blank, the thread profile of said member in an axial plane being curved and having a general inclination changing lengthwise of the thread with respect to the axis of the thread, in rotating said member in abrasive engagement with said gear blank at the ratio of the respective numbers of teeth and threads, and in effecting feeding motion between said member and said gear blank in the direction of the axis of the gear blank.

ERNEST WILDHABER.